United States Patent [19]

Takamura et al.

[11] Patent Number: 4,868,593

[45] Date of Patent: Sep. 19, 1989

[54] LIGHT PROJECTOR FOR A DISTANCE MEASURING DEVICE

[75] Inventors: Mashashi Takamura; Kiyotaka Kobayashi; Tokuji Sato; Yoji Naka, all of Tokyo, Japan

[73] Assignee: Fuji Photo Film Co., Ltd., Kanagawa, Japan

[21] Appl. No.: 224,702

[22] Filed: Jul. 27, 1988

[30] Foreign Application Priority Data

Jul. 29, 1987 [JP] Japan ............................ 62-115935[U]

[51] Int. Cl.[4] ........................... G03B 3/00; G01C 3/00
[52] U.S. Cl. .......................................... 354/403; 356/1
[58] Field of Search .................... 354/403, 165; 356/1, 356/4; 250/201 AF; 362/217, 220, 362, 368, 418

[56] References Cited

U.S. PATENT DOCUMENTS

| | | | |
|---|---|---|---|
| 2,397,160 | 3/1946 | Schwartz et al. ................... | 354/165 |
| 4,720,724 | 1/1988 | Yokoo ................................ | 354/403 |
| 4,740,676 | 4/1988 | Satoh et al. ....................... | 354/403 X |
| 4,782,356 | 11/1988 | Sano et al. ........................ | 354/403 |
| 4,804,991 | 2/1989 | Ishizuki et al. ..................... | 354/403 |

*Primary Examiner*—N. B. Perkey
*Attorney, Agent, or Firm*—Young & Thompson

[57] ABSTRACT

A light projector for a distance measuring device comprises a lens barrel holding projecting lenses and a lamp housing rotatably engaged with the lens barrel. The lamp housing containing a flash lamp comprises a front cover having a tube engaged with the lens barrel, and a back cover secured to the front cover. In the front cover, a slit is provided, with its center aligned with an optical axis of the projecting lenses, the longitudinal sides thereof being arranged precisely perpendicular to a base line of a distance measuring device. Between the lamp housing and the lens barrel, an inclination adjusting member is disposed. When the inclination adjusting member is rotated with a screwdriver, or a wrench, the lamp housing rotates about the optical axis of the projecting lenses, permitting the inclination of the slit light to be adjusted.

17 Claims, 4 Drawing Sheets

LIGHT PROJECTOR FOR A DISTANCE MEASURING DEVICE

BACKGROUND OF THE INVENTION

1. Field of the invention

The present invention relates to a light projector for a distance measuring device and more particularly to a light projector having an adjustment mechanism for adjusting the inclination of a flattened light beam which may be continuous or segmental.

2. Prior Art

There are known automatic focusing cameras which have a subject distance measuring device and a lens positioning device for positioning a taking lens according to output signals from the subject distance measuring device. A compact camera generally uses a subject distance measuring device of a so-called active type which measures the subject distance by projecting a light beam onto the subject, receiving the light reflected from the subject, and detecting the position of the light incident on a light sensor. There are two types of such an active type subject distance measuring device (which is hereinafter referred to as an "active type device"). One type projects a light beam having a circular cross section; whilst another projects a light beam (which is hereinafter referred to as a "slit light beam") having a rectangular cross section formed by a slit whose longitudinal direction is perpendicular to the base line of the active type device. The latter has an advantage that it can accurately measure the subject distance without performing a prefocussing operation even if the subject to be photographed is not in the center of the area in the viewfinder, such as when the subject comprises two or three persons standing side by side.

FIG. 6 shows a conventional automatic focusing camera having an active type device which projects such a slit light beam. A camera body 1 has a taking lens 2 in its front which is precisely set at a position corresponding to a measured subject distance by the lens positioning device. The camera body 1 also has a light projector 4 and a light receiver 5 with the taking lens 2 therebetween. The line passing through the centers of the light projector 4 and light receiver 5 is the base line BL for measuring the subject distance, and the distance between the centers of the light projector 4 and light receiver 5 is the base length.

FIG. 7 is a schematic illustration of a subject distance measuring device. The light projector 4 comprises a rod-like light source 8, a slit plate 9, and a projecting lens 10. Toward a subject 11 or a subject 12, the projector 4 projects a slit light beam of which the longitudinal direction of the cross section is perpendicular to the base line BL. The light receiver 5 comprises a light receiving lens 16 and a light sensor array 17 and photoelectrically converts received light which is part of the received slit light beam reflected from the subject 11 or 12. The light sensor array 17 comprises a plurality of rectangular photosensors 17a which are placed in a row parallel to the base line BL. Since the light reflected from the subject 11 or 12 is received by that one of photosensors that corresponds to the subject distance, the subject distance can be measured approximately by detecting which photosensor generates a photoelectrically converted signal. The lens positioning device positions the taking lens 2 according to the measured subject distance.

In a distance measuring device using a slit light beam, it is necessary that the longitudinal direction of the slit light beam be perpendicular to the base line BL as described above, and the longitudinal direction of each photo sensor 17a must also be perpendicular to the base line BL. If the longitudinal direction is not perpendicular to the base line, precise distance measurement is not possible because the reflected light is not received by the photosensor corresponding to the subject distance.

Conventionally, the inclination of the slit plate with its slit is adjusted so that the longitudinal direction of the slit is perpendicular to the base line BL, by means of a spring which biases the slit plate and two screws which contact the slit plate biased by the spring. However, this adjusting method has a serious problem in that it is quite difficult to adjust the inclination of the slit plate by rotating the screws alternately, keeping the center of the slit aligned with an optical axis 13a of the light projector 4. It consequently takes too long a time to adjust the device. Moreover, because the slit plate is supported at three points, there is another problem in that the number of parts increases and the projector becomes larger in size, thus raising the manufacturing cost.

OBJECT OF THE PRESENT INVENTION

It is therefore an object of the present invention to provide a light projector in which an adjuster adjusts the inclination so that the longitudinal direction of the cross section of a slit light beam is perpendicular to a base line used for subject distance measuring.

SUMMARY OF THE INVENTION

For achieving this and other objects and advantages, a light projector according to the present invention has a lens barrel holding a projecting lens, a lamp housing which is rotatably attached to the lens barrel and projects a slit light beam toward a subject with the length of the cross section of the slit light beam perpendicular to a base line, and an inclination adjusting member for rotating the lamp housing about the optical axis of the projecting lens. According to the present invention, the longitudinal direction of the cross section of the slit light beam can be precisely adjusted to be perpendicular to a base line of a distance measuring device merely by operating the inclination adjusting member. The adjusting operation is quite easy and the adjusting mechanism is also simple, reducing the number of parts accordingly. The manufacturing cost can, as a result, be substantially lowered.

BRIEF DESCRIPTION OF THE DRAWINGS

These and other objects and features of the invention will be seen by reference to the following description, taken in connection with the accompanying drawings, in which.

DETAILED DESCRIPTION OF THE INVENTION

Figure 1:
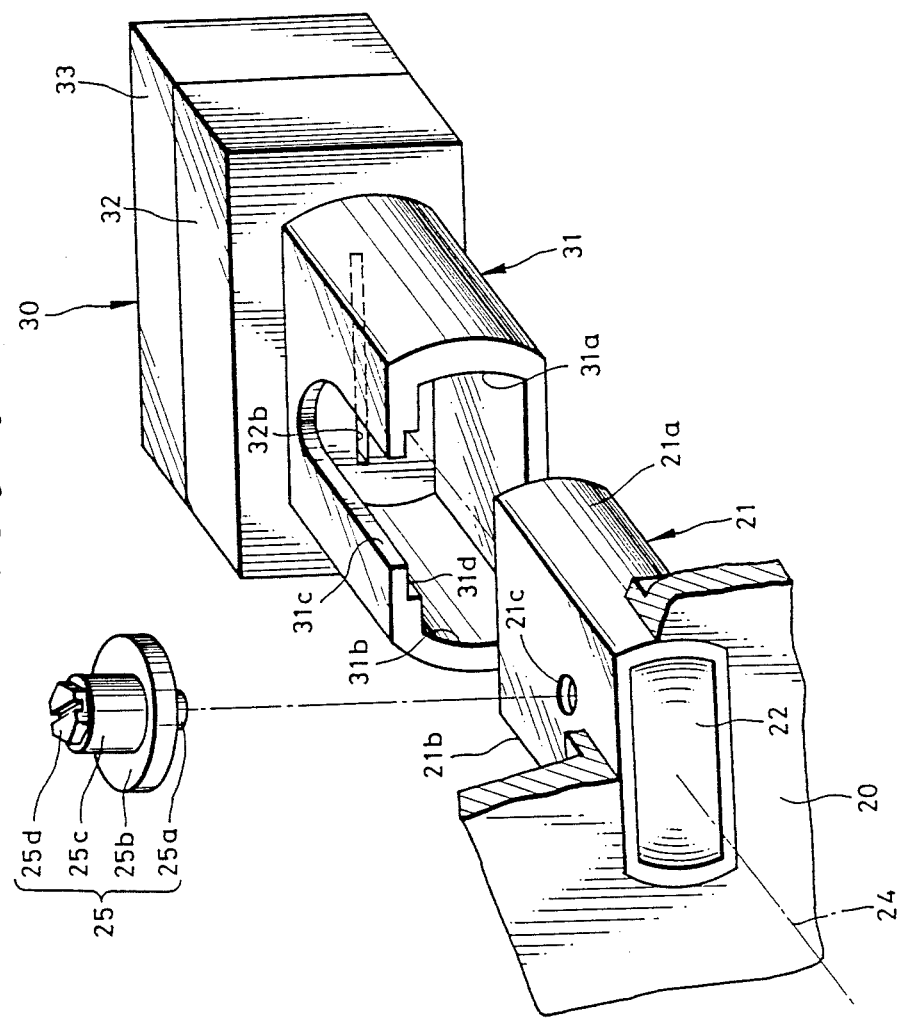
FIG. 1 is an exploded perspective view showing an embodiment of the present invention.
Figure 3:
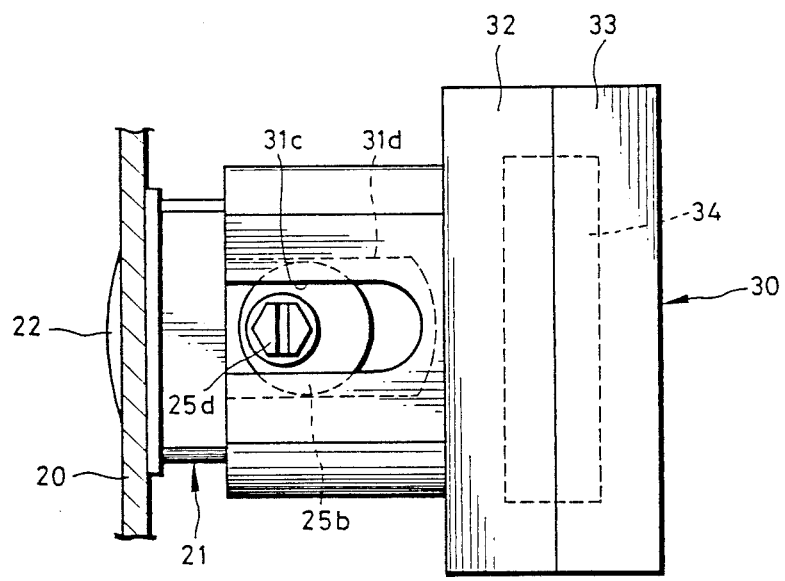
FIG. 3 is a plan view of the embodiment of FIG. 1.
Figure 6:
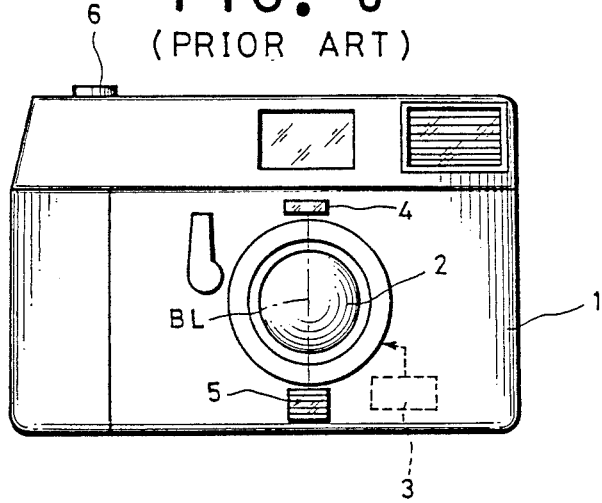
FIG. 6 is a front view showing a conventional automatic focusing camera incorporating a distance measuring device of a type projecting a slit light beam.
Figure 7:
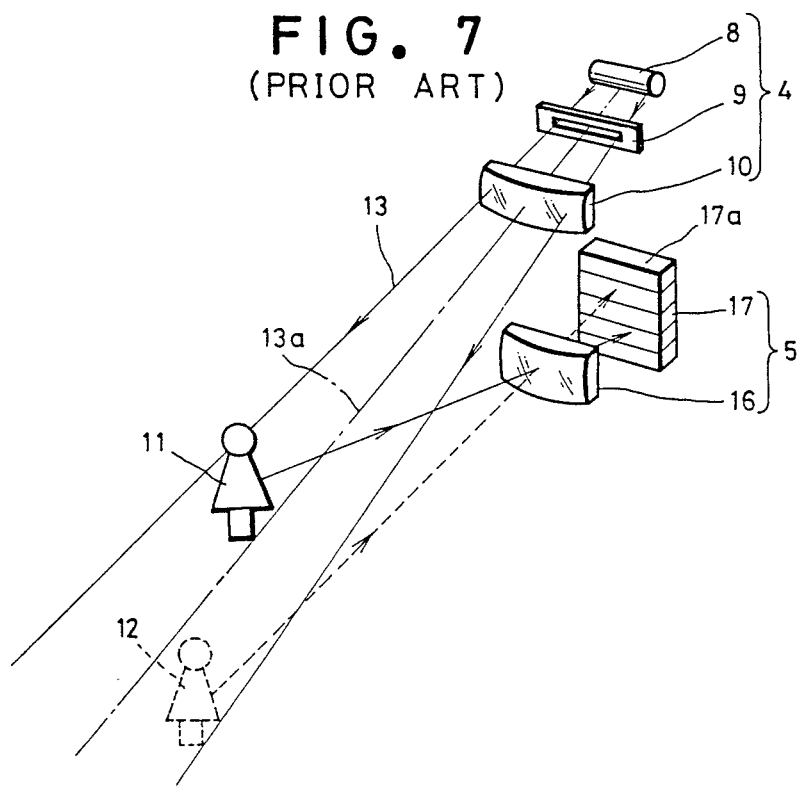
FIG. 7 is a schematic illustration of the conventional distance measuring device of FIG. 6.

With reference to FIGS. 1 and 3 showing an improved light projector which is used in a known distance measuring device as shown in FIGS. 6 and 7, the structure of the projector will be described in detail. Behind a front plate of a camera body, a shutter base plate 20 provided with a shutter for exposing a photographic film is disposed. A lens barrel 21 is fixedly mounted on the shutter base plate 20. In the lens barrel 21, projecting lenses 22, 23 are fixed with their common optical axis aligned with a projecting optical axis 24. The lens barrel 21 has flat portions on its top and bottom, and has convex surfaces on its right and left sides. The right and left curves of the cross section of the convex surfaces form a part of a circle whose center lies on the projecting optical axis 24, and the convex surfaces serve as guiding surface 21a, 21b. Disposed at the center of the top of the lens barrel 21 is a hole 21c in which a pin 25a of an inclination adjusting member 25 is rotatably fitted.

The inclination adjusting member 25 further comprises an eccentric disk 25b, a shaft 25c, and a hexagonal head 25d which are made of plastics in one piece. The disk 25b is eccentric to the pin 25a. The shaft 25c is attached to the eccentric disk 25b coaxially with the pin 25a. When rotating the inclination adjusting member 25, a wrench or the like is applied to the hexagonal head 25d or a screwdriver blade is inserted into the groove at the top of the hexagonal head 25d.

A lamp housing 30 comprises a front cover 32 integral with a flattened tube 31, and a back cover 33. The top and bottom inner walls of the tube 31 are flat and the right and left walls have concave inner surfaces. These right and left concave surfaces form a part of a circle whose center lies on the projection optical axis 24. These concave inner surfaces serve as sliding surfaces 31a, 31b. The lens barrel 21 is inserted into the tube 31 and can slidingly rotate in the tube 31 because the guiding surfaces 21a, 21b of the lens barrel 21 ar formed to fit the sliding surfaces 31a, 31b closely. Disposed in the flat top plate of the tube 31 is a slot 31c for receiving the shaft 25c of the inclination adjusting member 25. The width of the slot 31c is greater than the diameter of the shaft 25c. Under the slot 31c, a groove 31d provides a stepped shoulder whose width is greater than that of slot 31c. The eccentric circular plate 25b of the inclination adjusting member 25 fits into groove 31d. Both the slot 31c and the groove 31d extend to adjacent the front surface of the front cover 32. The height of the sliding surfaces 31a, 31b is greater than that of the guiding surfaces 21a, 21b so that the lamp housing 30 can have limited rotation relative to lens barrel 21 about the projecting optical axis 24.

Figure 2:
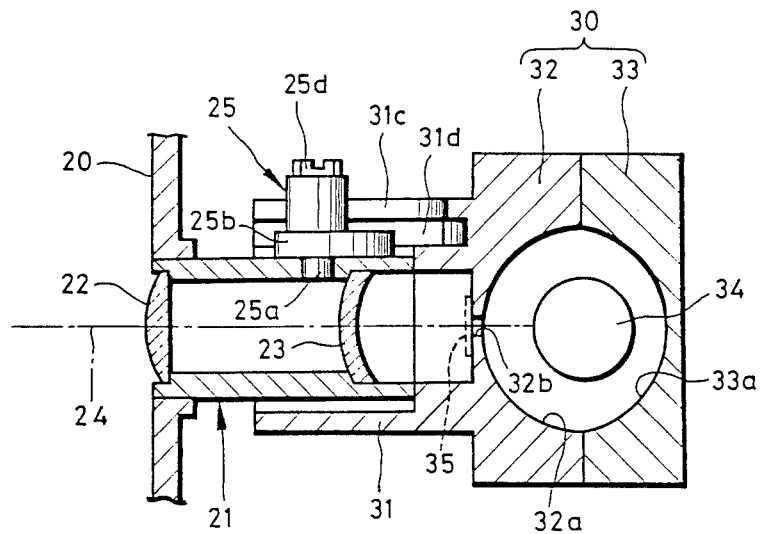
FIG. 2 is a cross sectional view of the embodiment of FIG. 1.

As shown in FIG. 2, the front cover 32 is provided with a semi-cylindrical inner surface 32a and a back cover 33 with an elliptical surface 33a. A rod-like light source such as a flash lamp 34 is provided, whose axis coincides with one focal line of the elliptical surface 33a. The other focal line of surface 33a lies on the semi-cylindrical inner surface 32a. A slit 32b is provided along this second focal line, which extends perpendicular to the plane of FIG. 2. A vapor-deposited layer of aluminum or the like is provided on the semi-cylindrical inner surface 32a and the elliptical surface 33a to provide mirror-finished surfaces having a high albedo. It is preferred to provide a near-infrared transmission filter designated by numeral 35 in front of or behind the slit 32b so as to distinguish between the slit light and daylight in the field to be photographed.

In assembling and adjusting the projector, first the lens barrel 21 provided with a projecting lens 22, 23 is secured to the shutter base plate 20. Then the pin 25a of the inclination adjusting member 25 is inserted into the hole 21c and thereafter the tube 31 of the lamp housing 30 is slid onto the lens barrel 21 with the eccentric disk 25b of the inclination adjusting member 25 entering into the groove 31d and the shaft 25c into the slot 31c, whereupon the guide surfaces 21a, 21b of the lens barrel 21 are in sliding contact with the sliding surfaces 31a, 31b of the tube 31.

Figure 4A:
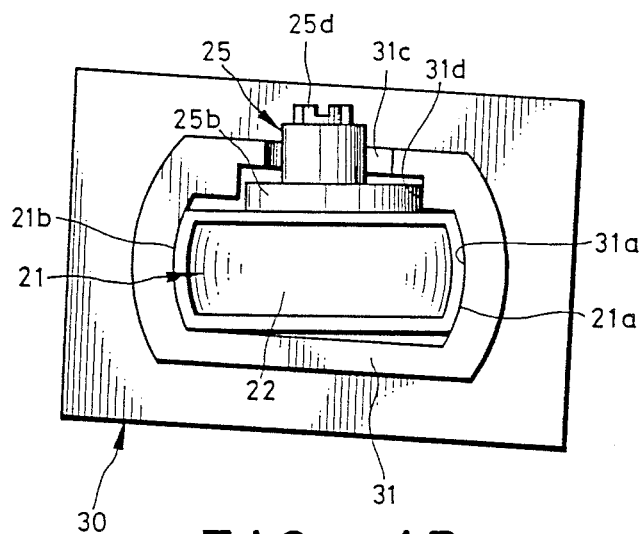
FIGS. 4A and 4B are explanatory views showing adjusting operation of the position of a lamp housing.
Figure 4B:
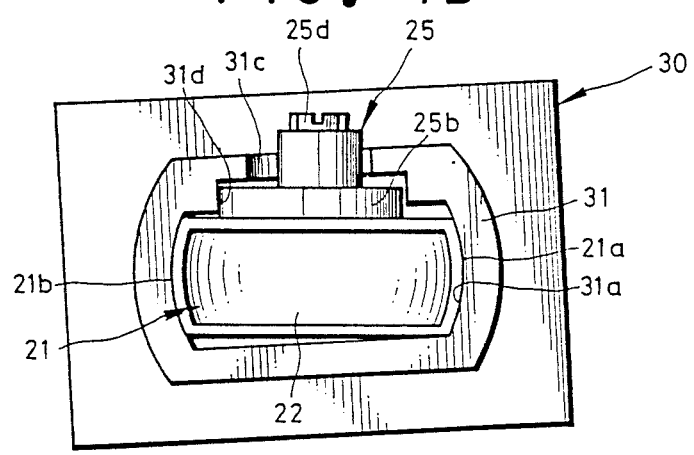

If the longer sides of the slit 32b are not precisely perpendicular to the base line BL (refer to FIG. 6), the inclination of the slit 32b is adjusted by rotating the inclination adjusting member 25 with a screwdriver or wrench. If the inclination adjusting member 25 is rotated clockwise in FIG. 1, the periphery of the eccentric disk 25b presses one side wall of the groove 31d. Hence, the tube 31 rotates clockwise along the guiding surfaces 21a, 21b of the lens barrel 21, and the lamp housing 30 thus becomes inclined relative to the lens barrel 21 as shown in FIG. 4A. At this time, both the center of the slit 32b and the axis of rotation of the lamp housing 30 remain coincident with the projecting optical axis 24, thereby permitting accurate adjustment of the slit 32b. Conversely, if the inclination adjusting member 25 is rotated counterclockwise, the periphery of disk 25b presses the other side wall of groove 31d and the lamp housing 30 rotates counterclockwise as shown in FIG. 4B.

After completion of the adjustment of the inclination of the slit 32b, the tube 31 is fixed to the lens barrel 21 with adhesive or set screws (not shown). When light is emitted from the flash lamp 34, only a part of the light which proceeds along the projecting optical axis 24 passes directly through the slit 32b. Instead, part of the light emitted rearward is reflected by the elliptical surface 33a toward the slit 32b. Still another part of the light emitted forward and diagonally is first reflected by the semicylindrical surface 32a rearward and penetrates the transparent tube of the flash lamp 34. Then the light is secondarily reflected by the elliptical surface 33a toward the slit 32b. The light passing through the slit 32b further passes through the projecting lenses 22, 23 which project a flat bundle of rays whose plane is precisely perpendicular to the base line BL. This slit light, reflected by a subject to be photographed, is received by the photosensor 17 corresponding to the subject distance, allowing precise distance measuring based on optical triangulation.

Figure 5:
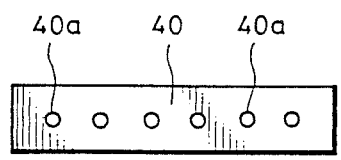
FIG. 5 is a front view showing another embodiment of a slit plate having a plurality of through holes.

In the above-described embodiment, the slit light beam has a continuous cross section in its longitudinal direction. However, such a slit light beam may be replaced by light beams which are spaced apart in this longitudinal direction. FIG. 5 shows the structure of such an embodiment. The slit section 40 defined in the front cover 32 has a plurality of aligned holes 40a, for example six, with a predetermined spacing. In this embodiment, from each hole, slit light beams are simultaneously emitted.

Instead of slit light beams, a row of light sources such as light-emitting diodes may be used to provide light beams. In this case, the light beams may be emitted simultaneously or sequentially.

Alternatively, a light beam from a light source may be caused to scan with a swingable mirror.

Instead of the eccentric disk 25b pressing against tube 31, the shaft 25c may be eccentric to the pin 25a and be fitted into a slot 31c of narrower width. In this case, the lamp housing 30 is rotated by pressure of the shaft 25c on the margins of slot 31c.

It is to be further understood that the form of the invention herein shown and described is to be taken as a preferred example of the same and that various changes in the shape, size and arrangement of parts may be resorted to without departing from the spirit of the invention or the scope of the appended claims.

What is claimed is:

1. A light projector for projecting light having a cross section which is elongated and continuous or segmental and whose longitudinal direction in cross section is perpendicular to a base line used in a distance measuring device, comprising:
    a lens barrel for holding projecting lens means;
    a lamp housing for projecting light, which is attached to said lens barrel and is rotatable about the optical axis of said projecting lenses; and
    an inclination adjusting member disposed between said lens barrel and said lamp housing for rotating said lamp housing about said optical axis.

2. A light projector as claimed in claim 1, wherein said inclination adjusting member comprises a pin rotatably attached to said lens barrel, an eccentric disk fitted into a groove defined in the lamp housing which contacts the periphery of the eccentric disk, and a head projecting from the eccentric disk and penetrating part of the lamp housing.

3. A light projector as claimed in claim 2, wherein said lamp housing comprises a front cover having a tube which rotatably encompasses said lens barrel, a back cover secured to the back of the front cover, and a rod-like light source contained in a hollow defined by the front and back covers.

4. A light projector as claimed in claim 3, wherein said rod-like light source is a flash lamp.

5. A light projector as claimed in claim 4, wherein inner surfaces of said hollow comprise a cylindrical surface formed in the front cover and an elliptical surface formed in the back cover.

6. A light projector as claimed in claim 5, wherein said light source is disposed on one focal line of the elliptical surface and a slit is disposed on the other focal line of the elliptical surface, the center of the slit being coincident with the optical axis of the projector.

7. A light projector as claimed in claim 6, wherein said slit is continuous.

8. A light projector as claimed in claim 6, wherein said slit comprises a plurality of holes disposed at a predetermined spacing.

9. A light projector as claimed in claim wherein said inclination adjusting member has a hexagonal head which is defined with a groove on the top of the head to receive a blade of a screwdriver.

10. A light projector as claimed in claim 3, wherein the tops and bottoms of said lens barrel and said tube are flat.

11. A light projector as claimed in claim 6, wherein a filter which allows infrared light to pass therethrough is disposed in front of the slit.

12. In a light projector comprising lamp housing which defines a slit and is adapted to contain a flash lamp, a lens barrel having projecting lens means for projecting slit light from the lamp housing toward a subject to be photographed:
    said lamp housing being rotatably attached to said lens barrel about an optical axis of the projecting lenses, the center of the slit being coincident with the optical axis of the projecting lenses; and
    said light projector comprising an inclination adjusting member which rotates the lamp housing about said optical axis and is disposed between the lens barrel and the lamp housing.

13. A light projector as claimed in claim 12, wherein said inclination adjusting member comprises a pin rotatably received in said lens barrel, an eccentric disk which is eccentric relative to the pin and whose outer periphery is disposed in a groove of said lamp housing, and a head which projects from the eccentric disk and extends through part of the lamp housing.

14. A light projector as claimed in claim 12, wherein said lamp housing comprises a front cover with a tube which is rotatably engaged with the lens barrel, and a back cover secured to the back of the front cover.

15. A light projector as claimed in claim 14, wherein an inner surface of said lamp housing comprises a cylindrical surface formed in the front cover, and a tubular elliptical surface.

16. A light projector as claimed in claim 15, wherein said slit is continuous.

17. A light projector as claimed in claim 13, wherein said head of the inclination adjusting member is shaped hexagonally and defined in the top with a groove into which a blade of a screwdriver is insertable.

* * * * *